United States Patent

Hara et al.

Patent Number: 5,478,627
Date of Patent: Dec. 26, 1995

[54] LAMINATE

[75] Inventors: Takahisa Hara, Kawanishi; Masahito Matsumoto, Ibaraki; Nobuhiro Usui, Takatsuki, all of Japan

[73] Assignee: Sumitomo Chemical Company, Limited, Osaka, Japan

[21] Appl. No.: 111,937

[22] Filed: Aug. 26, 1993

[30] Foreign Application Priority Data

Aug. 27, 1992 [JP] Japan .................................. 4-228484

[51] Int. Cl.⁶ ..................................................... B32B 3/00
[52] U.S. Cl. ......................... 428/156; 428/167; 428/172; 428/188; 428/212; 428/318.8
[58] Field of Search .................................. 428/156, 120, 428/178, 188, 172, 167, 31, 68, 137, 141, 166, 192, 212, 213, 318.8, 516, 519; 296/70, 146.1

[56] References Cited

U.S. PATENT DOCUMENTS

| | | | |
|---|---|---|---|
| 4,968,474 | 11/1990 | Ito | 264/513 |
| 5,034,171 | 7/1991 | Kiczek | 264/51 |

FOREIGN PATENT DOCUMENTS

| | | |
|---|---|---|
| 0322285 | 6/1989 | European Pat. Off. . |
| 3207620 | 9/1991 | Japan . |
| 478511 | 3/1992 | Japan . |
| 4078511 | 3/1992 | Japan . |
| 2158002 | 11/1985 | United Kingdom . |

OTHER PUBLICATIONS

Ken C. Rusch, "Gas Assisted Injection Molding a New Technology is Commercialized" Plastic Engineering, Jul. 1989 No. 7., pp. 35–38.

Hiroe et al., Guide to Plastic Molding, p. 191.

*Primary Examiner*—Donald J. Loney
*Attorney, Agent, or Firm*—Cushman Darby & Cushman

[57] ABSTRACT

A laminate comprising a core resin layer and a skin laminated integrally thereon is provided. The laminate has the projections, such as ribs, formed integral with the core resin layer with the same resin material as the core resin. Also, a hollow portion is formed in the inside of the resin layer near the intersection of the core resin layer and each projection. The laminate is free of sinks on the surface at its positions corresponding to the projections on the back side and has good appearance and excellent mechanical strength.

5 Claims, 3 Drawing Sheets

FIG. IA
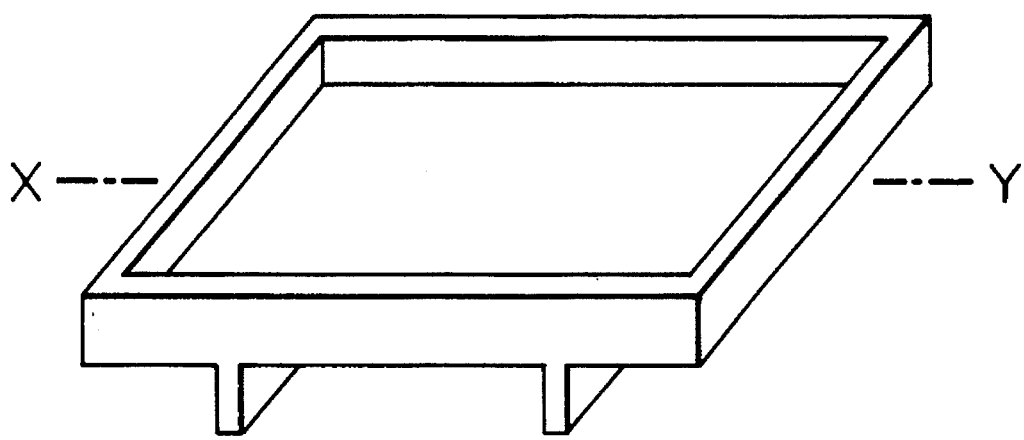
FIG. IB
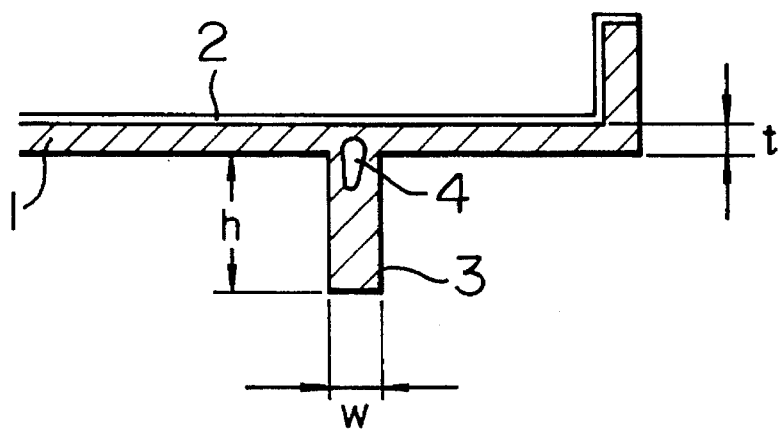

LAMINATE

BACKGROUND OF THE INVENTION

The present invention relates to a multilayer structured laminate (hereinafter referred to as laminate) consisting of a core resin layer having projections and a skin.

The plastic laminates made of thermoplastic resins, etc., are used in large quantities for a variety of commercial products such as interior parts for automobiles, household electric appliances, etc., owing to their many advantages such as good economy, light weight and easiness of shaping.

There are also known the laminates in which a skin coat is applied on the surface of the core resin layer for alleviating the defects of the plastic laminates, such as cheap appearance, sense of coldness and vulnerability to scratches or disfigurements, while providing fashionableness and sense of softness to the products.

Such laminates can be produced, for instance, by supplying a skin material and a molten core resin into the cavity between the male and female molds, then clamping and cooling the molds. In such molding, a plurality of continuous or discontinuous projections may be provided on the side of the core resin layer opposite from the skin applied side for the purpose of reinforcing the molded product or facilitating attachment or joining of the molded product to other parts or elements.

However, production of a laminate by the above method has the problem that since cooling of the area around the intersection of the resin layer and each projection is delayed in the cooling step after clamping, sinks tend to be generated on the laminate surface at its positions corresponding to the projections on the back side due to volumetric shrinkage of the resin. This problem becomes even more serious as the width of the projection is enlarged or as the thickness of the core resin layer is reduced.

SUMMARY OF THE INVENTION

In view of the above, the present inventors have endeavored to solve the prior art problems such as mentioned above and to offer a novel laminate having a plurality of continuous or discontinuous projections on the side of the core resin layer opposite from the skin applied side and free of sinks on the surface at its positions corresponding to the projections on the back side, and these efforts have led to the attainment of the present invention.

The present invention provides a laminate comprising a core resin layer made of a thermoplastic resin and a skin laminated integrally thereon, characterized in that on the side of the core resin layer opposite from the skin applied side, the laminate has the projections, such as ribs or the like, formed integral with said core resin layer with the same resin material as said resin layer, and that a hollow portion is formed in the inside of the resin layer near the intersection of said core resin layer and each projection.

BRIEF DESCRIPTION OF THE DRAWINGS

FIG. 1 is illustrations of a laminate according to the present invention, in which FIG. 1A is a general perspective view of the laminate, and FIG. 1B is a partial sectional view of a projection and its neighborhood, taken along the line X–Y of FIG. 1.

DETAILED DESCRIPTION OF THE INVENTION

Figure 2A:
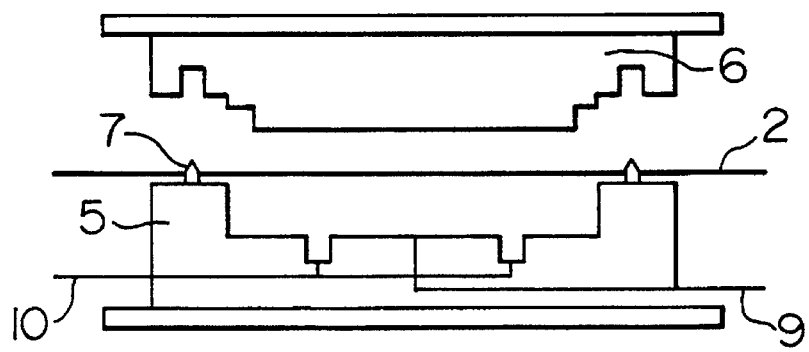
FIG. 2 is schematic illustrations of the process for producing a laminate of this invention by using a press molding method, with FIGS. 2A to 2D showing the sequential steps of molding.
Figure 2B:
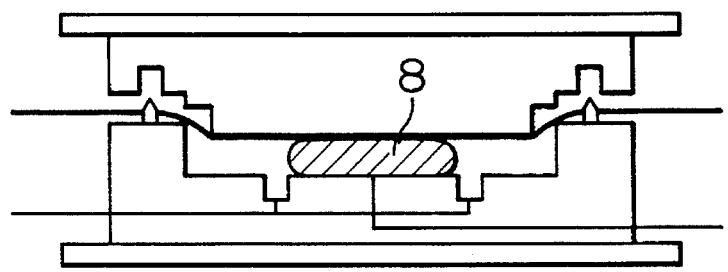
Figure 2C:
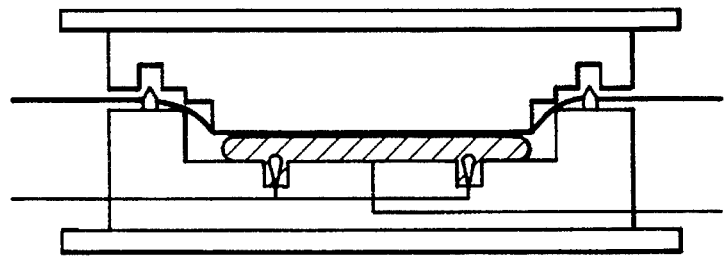

The laminate according to the present invention is described in detail below with reference to the accompanying drawings.

The laminate of this invention, as illustrated in a perspective view in FIG. 1, comprises essentially a core resin layer 1 and a skin 2 integrally laminated thereon. On the side of the core resin layer opposite from the skin applied side, there are provided the projections 3 formed integral with the core resin layer and made of the same resin material as said core resin layer. The greatest feature of the this laminate is that a hollow portion 4 is formed in the inside of the core resin layer near the intersection of the core resin layer 1 and each projection 3 as shown in FIG. 1B.

The projection 3 may be a continuous rib or may comprise an array of a plurality of pillar-like protuberances disposed spaced apart from each other. The number, shape and position of these projections may be properly decided according to the purpose of use of the laminate. For the purpose of reinforcing the laminate, usually the continuous projections are provided in a plural number.

In FIG. 1A is shown a laminate having two continuous projections 3.

The sectional shape of said projections may be suitably selected according to the purpose of use of the laminate. For instance, it may be rectangular, semi-circular or undulatory. A rectangular sectional shape is most common.

The width (thickness) w of the projection is preferably selected to satisfy the reaction of $t/w=0.2$–$1.3$, where $t$ is the thickness of the core resin layer, for the purpose of minimizing or eliminating the risk of forming sinks on the laminate surface. The height $h$ of the projection is not critical, but it is preferably about 1 to 5 times the thickness $t$ of the core resin layer.

The hollow portion 4 in the present invention is provided in the inside of the core resin near the intersection of the core resin layer 1 and each projection 3. This hollow portion may be a single cavity or may comprise a batch of continuous or discontinuous voids such as seen in a partially foamed material.

The size (spread) of the hollow portion is not strictly regulated. However, too large a size (spread) excessively diminishes the thickness of the surrounding resin portion, while too small a size (spread) can not produce the intended effect of the hollow. Thus, it is necessary to select a suitable size (spread) of the hollow portion.

The location of the hollow portion needs not be strictly specified as far as it is situated near the intersection of the core resin layer and the projection. The hollow portion may spread, to some extent, from said intersection, or it may exist unevenly around said intersection. In the latter case, the hollow portion is preferably biased toward the projection rather than to the core resin layer side.

It is essential that the hollow portion exists near said intersection, but such hollow may be also provided in other sections of the projection than the area near said intersection or partially in the core resin layer as far as the concept of the present invention is not spoiled.

In the present invention, a thermoplastic resin is used as composing material of the core resin layer. Such thermoplastic resin is not specified but may be any of those which have been generally used for press molding, injection molding, extrusion molding, etc., in the art. Typical examples of such thermo-plastic resins include polypropylene, polyethylene, polystyrene, polymethyl methacrylate, polycarbonate, polyacrylamide, acrylonitrile-butadiene-styrene block copolymer, nylon and the like. Among them, polypropylene resin, especially the one having a melt flow index of 35–100 g/10 min is preferred.

As the skin of the laminate of this invention, there can be used a sheet of a thermoplastic resin such as polyvinyl chloride and a sheet of a polyolefin- or styrene-based thermoplastic elastomer, as well as the fabrics, knits and non-woven cloths made of various kinds of material. It is also possible to use a composite sheet obtained by laminating on the back side of said sheet a polyolefin foamed sheet, urethane foamed sheet, polyvinyl chloride foamed sheet or the like.

It is further possible to use said sheet or composite sheet lined with other resin sheet or fabric for the purpose of protecting said sheet or composite sheet from heat of the molten thermoplastic resin in the course of molding or for the purpose of enhancing adhesiveness to said resin layer. The material used for the skin is properly selected according to the purpose of use of the laminate, but usually a skin obtained by laminating a polyolefin resin foamed sheet on a polyolefin-based thermoplastic elastomer sheet is preferably used.

As described above, the laminate of the present invention, although apparently not much different from the conventional ones as shown in FIG. 1A, is characterized, and quite distinguishable from the conventional ones, in that a hollow portion 4 is provided in the inside of the core resin near the intersection of the core resin layer 1 and each projection 3. Such void or voids can be formed by, for example, a method in which a chemical foaming agent is previously mixed in the core resin material and foaming is allowed to tape place only in the area near the intersection of the core resin layer and each projection in the course of molding, or a method in which a fluid is injected into the area around the intersection of the core resin layer and each projection in the molding process. The former method is effective when the core resin layer is relatively small in thickness. When the core resin layer is thick, the resin layer may be foamed in its entirety, making it unable to obtain the desired laminate. In the latter method, a gas such as air, nitrogen gas, etc., or a liquid such as water is used as fluid, but usually a gas is employed.

Such a laminate can be molded by various methods such as press molding and injection molding. Press molding is preferred as the molding pressure can be set at a lower level than in injection molding.

A process for producing a laminate of this invention by press molding is illustrated in FIG. 2.

First, a skin material 2 is placed between a female mold 5 having the recessions in the mold face in positional correspondence to the projections of the molded product and a male mold 6 (FIG. 2A), and the male mold 6 is lowered down to start clamping. When a desired clearance is formed between the male and female molds, the clamping motion is stopped or reduced in speed, and a core resin 8 of the molten state is supplied into the cavity of the mold assembly in a non-closed state through a resin supply passage 9 (FIG. 2B), after which clamping is resumed.

After the molten resin has been supplied, injection of a fluid such as nitrogen gas from a fluid supply pipe 10 is started from the ends of the resin projections in the cavity (FIG. 2C) during the period till clamping is completed, preferably immediately before clamping is completed. The end of the fluid supply pipe is preferably designed to constitute a capillary.

When a liquid is used as fluid, the injected liquid is gasified by the heat of the molten resin in the course of molding, and the voids are formed by this gas.

When a chemical foaming agent is used, it is mixed in the molten resin to be supplied into the mold cavity, and usually no supply of fluid is made.

Figure 2D:
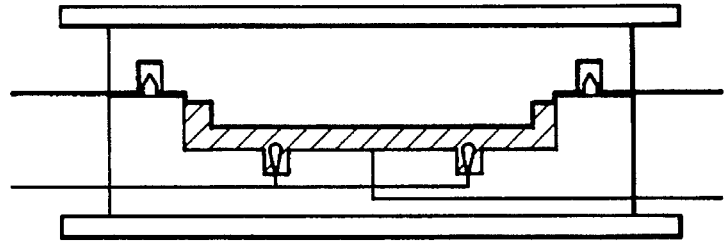

Clamping is continued while the fluid is injected (FIG. 2D). After clamping has been completed, supply of the fluid is stopped, and the mold is cooled and opened to take out the molded product.

DESCRIPTION OF PREFERRED EMBODIMENT

The present invention is described in further detail below with reference to the examples thereof, which examples, however, are merely intended to be illustrative and not to be construed as limiting the scope of the invention.

EXAMPLE 1

A skin material comprising an embossed 0.6 mm thick polyolefin elastomer sheet and, laminated thereon, a 3 mm thick foamed polypropylene sheet with a foaming rate of 15 times was placed between the male and female molds. Then, under clamping, a resin composition comprising a polypropylene (SUMITOMO NORBRENE BPZ5077 produced by Sumitomo Chemical Co., Ltd., MFR=40 g/10 min) blended with 1.5 wt % of an ADCA based master batch (produced by Sankyo Chemical Industries Co., Ltd., containing 30 wt % of an ADCA based foaming agent) was supplied in a molten state. After further clamping, the mold was cooled to obtain a laminate having a shape such as shown in FIG. 1A, comprising a 2 mm thick core resin layer provided with two projections each having a length of 200 mm, a height of 8 mm and a width of 6 mm.

Figure 3:
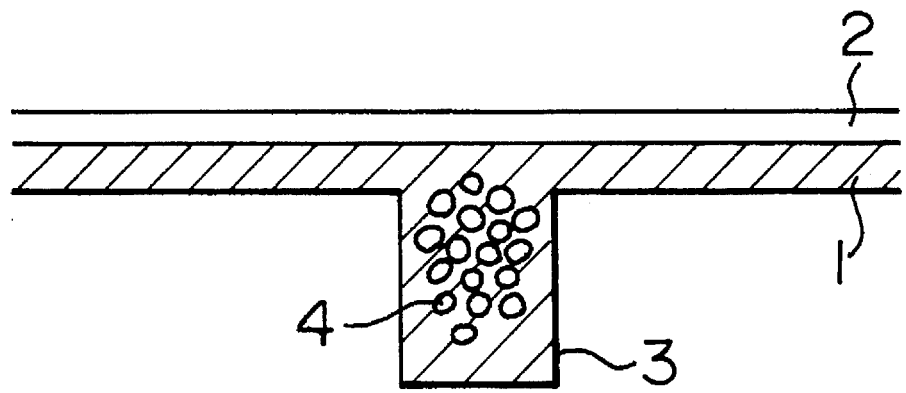
FIG. 3 is a partial sectional view of a projecting portion of the laminate of this invention obtained in Examples 1 and 2.

The obtained laminate, as shown in FIG. 3, had a group of voids formed somewhat biased toward the projection from the intersection of the core resin layer and the projection. Also, this laminate had a good visual appearance with no sinks or bulges on the surface at its positions corresponding to the projections on the back side.

Comparative Example 1

A laminate was obtained by following the same procedure as Example 1 except for use of a polypropylene not blended with the ADCA based master batch.

Figure 4:
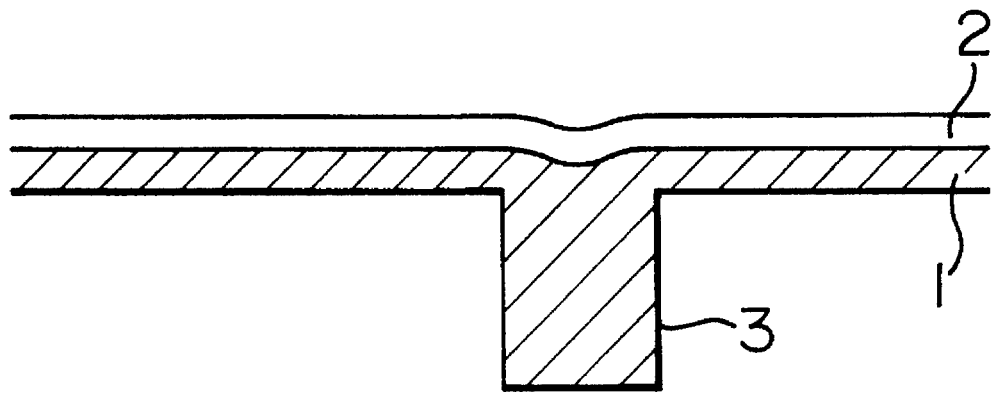
FIG. 4 is a similar view to FIG. 3 of the laminate obtained in Comparative Examples 1 and 2.

The obtained laminate, as shown in FIG. 4, had no void formed near the intersection of the core resin layer and each projection, and there were sinks on the product surface at its positions corresponding to the backside projections.

EXAMPLE 2

By following the procedure of Example 1, there was obtained a laminate having a shape such as shown in FIG. 1A, comprising a 2.5 mm thick core resin layer provided with two projections each having a length of 200 mm, a height of 8 mm and a width of 3 mm.

In the obtained laminate, as shown in FIG. 3, there were formed a batch of voids positioned somewhat biased toward the projection from the intersection of the core resin layer and each projection. This laminate also had a good external appearance with no sinks or bulges on the surface at its positions corresponding to the projections on the back side.

Comparative Example 2

A laminate was obtained in the same way as Example 2 except for use of a polypropylene not blended with the ADCA based master batch.

The obtained laminate, as shown in FIG. 4, had no void formed near the intersection of the core resin layer and each projection, and there were sinks on the surface at its positions corresponding to the backside projections.

EXAMPLE 3

A skin material comprising an embossed 0.6 mm thick polyolefin elastomer sheet and, laminated thereon, a 3 mm thick foamed polypropylene sheet with a foaming rate of 15 times was placed between the male and female molds of the molding device shown in FIG. 2. Then, a polypropylene (SUMITOMO NORBRENE BPZ5077 produced by Sumitomo Chemical Co., Ltd., MFR=40 g/10 min) was supplied in a molten state into the mold cavity under clamping. Just before completion of clamping, injection of nitrogen gas from a capillary tube at the end of a fluid passage in the mold was started from the ends of the resin projections in the cavity.

On completion of clamping, injection of nitrogen gas was stopped, and the mold was cooled to obtain a laminate having a shape such as shown in FIG. 1A, comprising a 2 mm thick core resin layer provided with two projections each having a length of 200 mm, a height of 8 mm and a width of 6 mm.

The obtained laminate, as shown in FIG. 1B, had a batch of voids formed near the intersection of the core resin layer and each projection. This laminate also had a good appearance with no sinks or bulges on the surface at its positions corresponding to the projections on the rear side.

The laminate of the present invention is easy to produce and free of sinks due to volmetric shrinkage of the core resin although having ribs, and also has good appearance and excellent mechanical strength.

What is claimed is:

1. A laminate comprising a resin layer made of:

a thermoplastic resin; and a skin integrally laminated on the theromplastic resin, wherein the laminate has rectangular projections formed integral with said resin layer on the side thereof opposite from the skin applied side, said resin layer having a hollow portion formed therein near each rectangular projection, and wherein the ratio of the thickness t of the resin layer to the width w of each rectangular projection is: t/w=0.2–1.3 and the height h of the rectangular projection is about 1 to 5 times the thickness t of the resin layer.

2. A laminate according to claim 1, which laminate is an interior part of an automobile.

3. A laminate according to claim 2, wherein the interior part is an instrument panel or a door trim.

4. A laminate according to any of claims 2 or 3, wherein the thermoplastic resin is a polypropylene resin.

5. A laminate according to claim 4, wherein the polypropylene resin is the one with a melt flow index of 35–100 g/10 min.

\* \* \* \* \*